United States Patent

Ryan et al.

[11] Patent Number: 5,993,393
[45] Date of Patent: Nov. 30, 1999

[54] METHODS AND APPARATUS FOR THE EXAMINATION AND TREATMENT OF INTERNAL ORGANS

[75] Inventors: Patrick Joseph Ryan, Thames Ditton; Christopher John Barlow; Robert Julian Dickinson, both of London, all of United Kingdom

[73] Assignee: Intravascular Research Limited, Isleworth, United Kingdom

[21] Appl. No.: 08/367,276

[22] PCT Filed: Jun. 16, 1993

[86] PCT No.: PCT/GB93/01279

§ 371 Date: Jan. 12, 1995

§ 102(e) Date: Jan. 12, 1995

[87] PCT Pub. No.: WO94/01786

PCT Pub. Date: Jan. 20, 1994

[30] Foreign Application Priority Data

Jul. 14, 1992 [GB] United Kingdom ............. 9214935

[51] Int. Cl.⁶ ........................................ A61B 8/12
[52] U.S. Cl. .................................. 600/463; 600/447
[58] Field of Search ............... 128/660.01, 660.07, 128/661.01, 662.03, 662.06; 73/625–626; 600/437, 443, 447, 459, 462–463

[56] References Cited

U.S. PATENT DOCUMENTS

| 3,548,642 | 12/1970 | Flaherty et al. . |
| 4,161,122 | 7/1979 | Buchnes ................................. 73/626 |
| 4,209,853 | 6/1980 | Hyatt . |
| 4,215,584 | 8/1980 | Kuroda et al. ..................... 128/661.01 |
| 4,254,662 | 3/1981 | Kuroda et al. ................. 128/661.01 X |
| 4,325,257 | 4/1982 | Kino et al. ................................ 73/626 |
| 4,442,715 | 4/1984 | Brisken et al. ................ 128/661.01 X |
| 4,459,853 | 7/1984 | Miwa et al. .................... 128/661.01 X |
| 4,653,000 | 3/1987 | Matsumoto ............................. 600/443 |
| 4,733,562 | 3/1988 | Saugeon . |
| 4,787,392 | 11/1988 | Saugeon ............................. 128/661.01 |
| 4,815,047 | 3/1989 | Hart . |
| 4,870,972 | 10/1989 | Maerfeld et al. ................... 128/662.03 |
| 4,917,097 | 4/1990 | Proudian et al. . |
| 5,014,711 | 5/1991 | Nagasaki . |
| 5,081,993 | 1/1992 | Kitney et al. . |
| 5,123,415 | 6/1992 | Daigle . |
| 5,186,177 | 2/1993 | O'Donnell et al. ................ 128/661.01 |
| 5,203,335 | 4/1993 | Noujaim et al. ................... 128/661.01 |
| 5,257,629 | 11/1993 | Kitney et al. ...................... 128/661.01 |
| 5,269,309 | 12/1993 | Fort et al. ............................... 600/447 |
| 5,329,930 | 7/1994 | Thomas, III et al. . |
| 5,431,167 | 7/1995 | Savord ............................... 128/660.07 |
| 5,453,575 | 9/1995 | O'Donnell et al. ................ 128/662.06 |

FOREIGN PATENT DOCUMENTS

| 0181677 | 5/1986 | European Pat. Off. . |
| 0204000 | 12/1986 | European Pat. Off. . |
| 0293773 | 12/1988 | European Pat. Off. . |
| 0017383 | 10/1990 | European Pat. Off. . |

(List continued on next page.)

OTHER PUBLICATIONS

H. Rost et al, "Digitale Signalverarbeitung Bei Ultraschallscannern", Funkschau, No. 3, Mar. 1, 1982, pp. 53–56 and English–Language Translation.

(List continued on next page.)

*Primary Examiner*—Francis J. Jaworski
*Attorney, Agent, or Firm*—Richard M. Goldberg

[57] ABSTRACT

Ultrasonic apparatus for visualizing the internal organs of the human body using an ultrasonic array probe is characterized by means for digitising the ultrasonic echo signals and means for processing the digitised signals. Data may be sampled from each array element excited separately, or on a group of elements sequentially with a very small time increment between samples. Processing of data can include switching the transmit carrier frequency between scans, compensation for ringing effects in the transducers, synthetic aperture focussing techniques, software envelope or transform demodulation, attenuation or time gain correction and data compression.

21 Claims, 2 Drawing Sheets

FOREIGN PATENT DOCUMENTS

| | | |
|---|---|---|
| 3327525 | 4/1985 | Germany . |
| 2011074 | 7/1979 | United Kingdom . |
| 2027197 | 2/1980 | United Kingdom . |
| 1577659 | 10/1980 | United Kingdom . |
| 2048478 | 12/1980 | United Kingdom . |
| 2053476 | 2/1981 | United Kingdom . |
| 2072847 | 10/1981 | United Kingdom . |
| 2208138 | 3/1989 | United Kingdom . |
| 2212267 | 7/1989 | United Kingdom . |
| 2246632 | 2/1992 | United Kingdom . |
| 2258364 | 2/1993 | United Kingdom . |
| WO8508892 | 2/1985 | WIPO . |
| WO85003354 | 8/1985 | WIPO . |
| WO8904142 | 5/1989 | WIPO . |
| WO9014601 | 11/1990 | WIPO . |

OTHER PUBLICATIONS

M. O'Donnell and L.J. Thomas, "Efficient Synthetic Aperture Imaging from a Circular Aperture with Possible Application to Cathether–Based Imaging", IEEE Transactions on Ultrasonics, Ferroelectrics, and Frequency Control, vol. 39, No. 3, May, 1992, pp. 366–380.

S.A. Johnson et al, "Digital Computer Simulation Study of a Real–Time Collection, Post–Processing Synthetic Focusing Ultrasound Cardiac Camera", pp. 193–211 (date unknown).

Declaration of Robert J. Dickinson, and Attachment A.

Complaint by Endosonics against IRL, and Attachments A–H.

Complaint by IRL against Endosonics, and Attachments A–B.

Plaintif Endosonics Corporation's Responses to Defendant Intravascular Research Limited's First Set of Specially Prepared Interrogatories (Nos. 1–5) in the California Action.

Defendant Endosonics Corporation's Response to Plaintiff Intravascular Research Limited's First Interrogatory in the Delaware Action.

Notice of Dismissal of the lawsuit filed by Endosonics in the Superior Court of the State of California for the County of Sacramento.

First Amended Answer and Counterclaims of Defendant Endosonics Corporation, filed in the U.S. District Court for the District of Delaware.

Defendant–Countercalimant Endosonics Corporation's Covenant of Nonliability in Support of the Motion to Dismiss the Second Counterclaim Asserted by Plaintiff–Counterdefendant Intravascular Research Limited, filed in the U.S. District Court for the District of Delaware.

Redacted version of Defendant/Counter–Claimant Endosonics Corporation's Responses to Intravascular Research Limited's First Set of Interrogatories in the Delaware lawsuit.

S. Bennett et al, "A Real–time Synthetic Aperture Digital Acoustic Imaging System," *Acoustic Imaging*, vol. 10, pp. 669–692 (undated).

Busse, L.J. et al, "Sparse Circular Array Methods, Performance, and Application to Intravascular Imaging", *1991 IEEE Ultrasonics Symposium*, pp. 641–644 (undated).

S.W. Flax et al, "Phase–Aberration Correction Using Signals From Point Reflectors and Diffuse Scatterers: Basic Principles", *IEEE Transactions on Ultrasonics, Ferroelectrics, and Frequency Control*, vol. 35, No. 6, pp. 758–767, Nov. 1988.

K. Liang et al, "A 50 Mhz Synthetic Focus System", *Acoustical Imaging: Proceedings of the Int'l. Symposium*, vol. 11, pp. 625–645 (undated).

Stephen J. Norton, "Reconstruction of a Reflectivity Field From Line Integrals Over Circular Paths", *J. Acoust. Soc. Am.*, vol. 67, No. 3, pp. 853–863, Mar., 1980.

Stephen J. Norton, "Annular Array Imaging with Full–Aperture Resolution", *J. Acoust. Soc. Am.*, vol. 92, No. 6, Dec., 1992, pp. 3202–3206.

M. O'Donnell et al, "Phase–Aberration Correction Using Signals From Point Reflectors and Diffuse Scatterers: Measurements", *IEEE Transactions on Ultrasonics, Ferroelectrics, and Frequency Control*, vol. 35, No. 6, pp. 768–774, Nov. 1988.

Matthew O'Donnell et al, "Efficient Synthetic Aperture Imaging from a Circular Aperture with Possible Application to Catheter–Based Imaging", *IEEE Transactions on Ultrasonics, Ferroelectrics, and Frequency Control*, vol. 39, No. 3, pp. 36–380, May, 1992.

B.M. Shapo et al, "Efficient Synthetic Aperture–Based Imaging from a Circular Array: Experimental results on a Catheter Probe", *1993 IEEE Ultrasonics Symposium*, pp. 1099–1102 (undated).

Brochure of Endosonics—The Cathscanner Intracoronary Imaging System, 1992.

Brochure of Endosonics—Oracle Imaging System (undated).

Brochure of Endosonics—In–Vision (undated).

Brochure of Endosonics—Visions 3.5F (undated).

Brochure of Endosonics—Visions Five–64 (undated).

"An Experimental 2 MHz Synthetic Aperture Sonar System Intended for Medical Use", IEEE Transactions on Sonics and Ultrasonics, by Christoph B. Burckhardt et al, vol. SU–21, No. 1, Jan. 1974, p. 1.

"An Experimental 2 MHz Synthetic Aperture Sonar System Intended for Medical Use", IEEE Transactions on Sonics and Ultrasonics, by Christoph B. Burckhardt et al, vol. SU–21, No. 1, Jan., 1974, p. 1.

FIG. 1A

FIG. 1B — DELAY $t\Delta$ — $t\Delta$ CONTINUOUS

FIG. 1C — $\Delta t = n\Delta\tau$ — $t\Delta$ DISCRETE AND CANNOT BE LESS THAN $\Delta\tau$

$t\Delta \leq \Delta\tau \quad y(t+\Delta t) = \text{function}\,[\,y(t \div \Delta\tau), y(t)\,]$ DELAY = $\Delta t$ IS CONTINUOUS AND $< \Delta\tau$

FIG. 4

METHODS AND APPARATUS FOR THE EXAMINATION AND TREATMENT OF INTERNAL ORGANS

BACKGROUND OF THE INVENTION

The present invention relates to methods and apparatus for the examination and treatment of internal organs of the human body.

It is already known to make an internal examination of an internal human organ, without recourse to surgery, by means of equipment which makes use of the transmission and receipt of ultrasonic signals.

International application nos. WO89/04142 and WO90/14601 disclose two such systems.

In these systems a catheter is provided at its distal end with a piezo-electric crystal transducer array made up of a plurality of transducer segments arranged in an annular or cylindrical configuration around the end of the catheter or an extension of it.

In these disclosed systems the array typically consists of twelve transducer elements although it can be a larger number, e.g thirty-two or sixty-four. The method of energising the transducer array disclosed in these applications consists of (in the case of the twelve element array) energising four transducers at a time, each of the four transducers being distributed 90° apart around the periphery of the annulus or cylinder. There are thus three sets of four transducer elements each arranged in a cruciform configuration so that as each cruciform is successively energised there is provided, as it were, a rotating cruciform ultrasonic beam.

The present invention is concerned with providing an improved energisation arrangement for generating so-called two-dimensional B-mode images in real time. Our earlier application WO90/14601 was also concerned with the provision of such images.

Ultrasound beam-forming from a transducer array of the kind referred to above relies on the received echo signals generated by the discrete transducer elements making up the array being delayed by differing amounts in order to get the individual echo signals into phase with another and then summing the echo signals in order to provide the signal from which an image can then be produced. The delays that are required will depend upon the varying distances of the individual transducers from the reflecting surface and will be selected to electronically focus the reflected echo signals.

In known ultrasonic systems having an array of transducers it is common to have several transducers energised at once and for the resultant echo signals to be handled by a plurality of parallel processing channels. The advantage of this arrangement is that the processing can be done in real time using analog hardware.

Figure 1A:
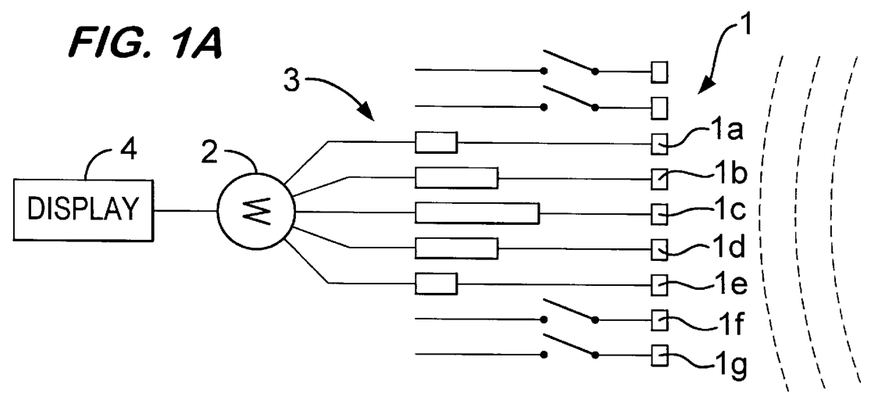
FIG. 1 is a diagrammatic representation of known prior art ultrasonic signal processing arrangements.

FIG. 1A illustrates the essence of this kind of prior art arrangement in which a plurality of discrete transducer elements 1 (typically 1a, 1b, 1c, 1d, and 1e) are individually connected to a summing circuit 2 through associated individual delay lines 3, these delay lines introducing delays which ensure that all the signals from a designated point (focus) are in phase on arrival at the summing circuit 2. The element group is scanned along line 1 which equals the result of signals from 1a, 1b, 1c, 1d and 1e, and defines a scan line 1. Another group 1b, 1c, 1d, 1e and 1f would then define an adjacent scan line 2.

Stepping through element groups in this way will define a raster of scan lines to give a 2-D image.

Figure 1B:
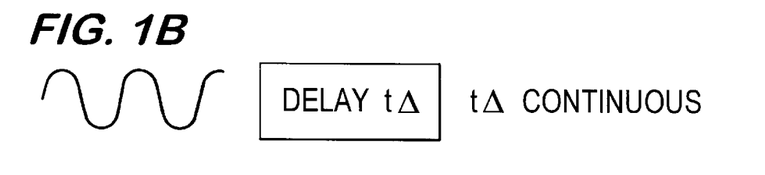

FIG. 1B illustrates the position where analog delay lines are used. In this arrangement the signals are not sampled and the signals remain in an analog and unsampled form until after the generation of scan lines.

Figure 1C:
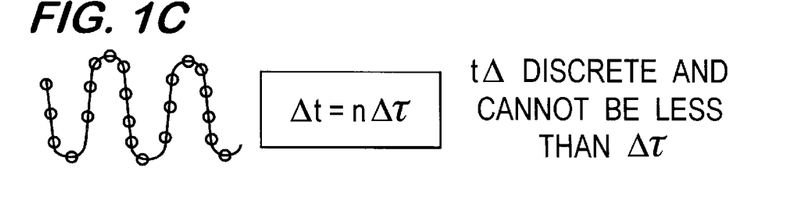

FIG. 1C illustrates the position if one wishes to take advantage of digital processing. In this arrangement digital delay lines are used and the data is sampled. The sampling intervals must be the minimum delay increment (or accuracy). In practice this means that the sampling frequency needs to be at least 20 times the ultrasonic frequency. If this arrangement were used in connection with the field of the present invention this would means having a sampling frequency of 400 MHz. This in turn would put great demands on the hardware that would be necessary and is the approach which is adopted in U.S. Pat. No. 4,917,097 (Endosonics) where there is sampling at 400 MHz. In this prior art arrangement the delays are then achieved by simple clock delays.

The present invention is concerned with providing an arrangement which will overcome the disadvantages of the kind of system disclosed in U.S. Pat. No. 4,917,097.

SUMMARY OF THE INVENTION

There is disclosed in the publication Funkschau No. 3, 1st March 1982 at pages 53–56 in an article by Rost and Paulke entitled "Digital Signal Processing in Ultrasound Scanners" a digital processing system of a kind already referred to in connection with FIG. 1C. In this prior art system the delays required in order to focus the ultrasonic beam are achieved by simple clock delays, thus there is sampling at 56 MHz for a 7 MHz signal. The disadvantage of this prior art arrangement is that the delays which can be achieved are limited to the sampling interval and for sensible sampling rates this introduces an error into the accuracy of the delay.

According to the present invention, an ultrasonic apparatus for visualizing internal organs of a human body, includes means for energizing elements of an ultrasonic transducer array to transmit ultrasonic vibrations from the elements; means for acquiring echo signals in response to said energization; means for digitizing said echo signals; means for applying a delay to each echo signal; means for sampling the echo signals; and said means for applying a delay operates independently of the means for sampling and is under a stored program control to enable the delays to be produced by interpolation.

According to a first aspect of the present invention, an ultrasonic apparatus for visualizing internal organs of a human body, includes: means for energizing elements of an ultrasonic transducer array to transmit ultrasonic vibrations from the elements; means for acquiring echo signals in response to said energization; means for digitizing said echo signals; means for applying a delay to each echo signal; means for sampling the echo signals; and means for generating a constant-size data block irrespective of a field of view of the transducer array.

According to a second aspect of the present invention, an ultrasonic apparatus for visualizing internal organs of a human body, includes: means for energizing elements of an ultrasonic transducer array to transmit ultrasonic vibrations from the elements; means for acquiring echo signals in response to said energization; means for digitizing said echo signals; means for applying a delay to each echo signal; means for sampling the echo signals; and means for exciting transducers of said transducer array at two frequencies, one frequency being a non-resonant frequency in order to reduce ring-down.

According to a third aspect of the present invention, an ultrasonic apparatus for visualizing internal organs of a human body, includes: means for energizing elements of an ultrasonic transducer array to transmit ultrasonic vibrations from the elements; means for acquiring echo signals in response to said energization; means for digitizing said echo signals; means for applying a delay to each echo signal; means for sampling the echo signals; and means for displaying the echo signals, said means for displaying including a windows icon menu pointer (WIMP) user interface.

According to a fourth aspect of the present invention, an ultrasonic apparatus for visualizing internal organs of a human body, includes: means for energizing elements of an ultrasonic transducer array to transmit ultrasonic vibrations from the elements; means for acquiring echo signals in response to said energization; means for digitizing said echo signals; means for applying a delay to each echo signal; means for sampling the echo signals; and means for employing a synthetic aperture focusing technique (SAFT) with respect to said echo signals.

According to a fifth aspect of the present invention, an ultrasonic apparatus for visualizing internal organs of a human body, includes: means for exciting a sub-group of adjacent transducer elements of an ultrasonic transducer array to transmit ultrasonic vibrations from the elements; means for acquiring echo signals in response to said energization; means for digitizing said echo signals; means for applying a delay to each echo signal; and means for sampling the echo signals received by both a given transducer element and at least one other adjacent transducer element.

BRIEF DESCRIPTION OF THE DRAWING

How the invention may be carried out will now be described by way of example only and with reference to the accompanying drawings in which.

DETAILED DESCRIPTION OF THE PREFERRED EMBODIMENTS

Figure 2:
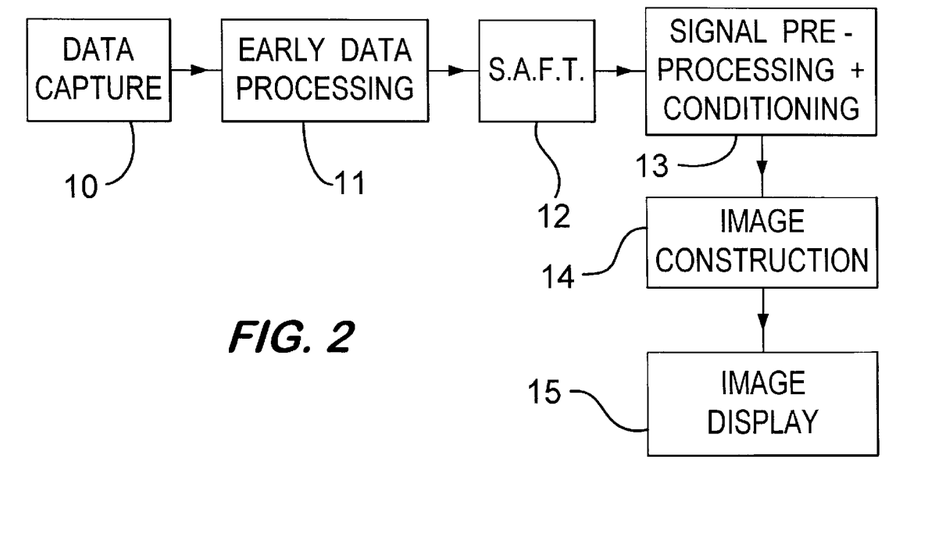
FIG. 2 is a flow diagram of the steps relating to a system incorporating the present invention.
Figure 3:
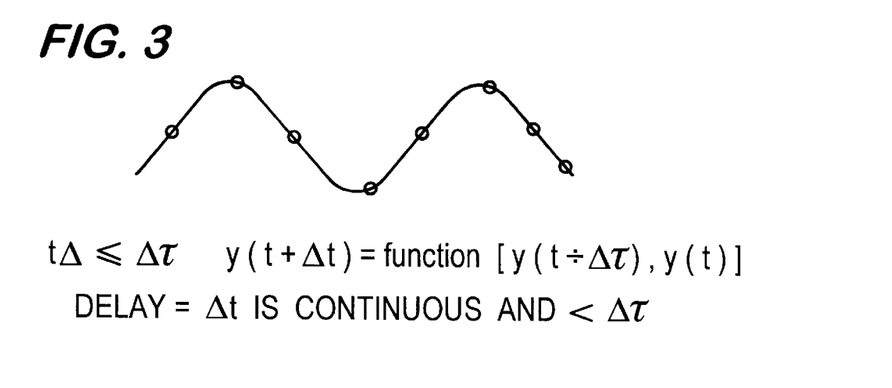
FIG. 3 is equivalent to FIG. 1 but showing an embodiment of the present invention.
Figure 4:
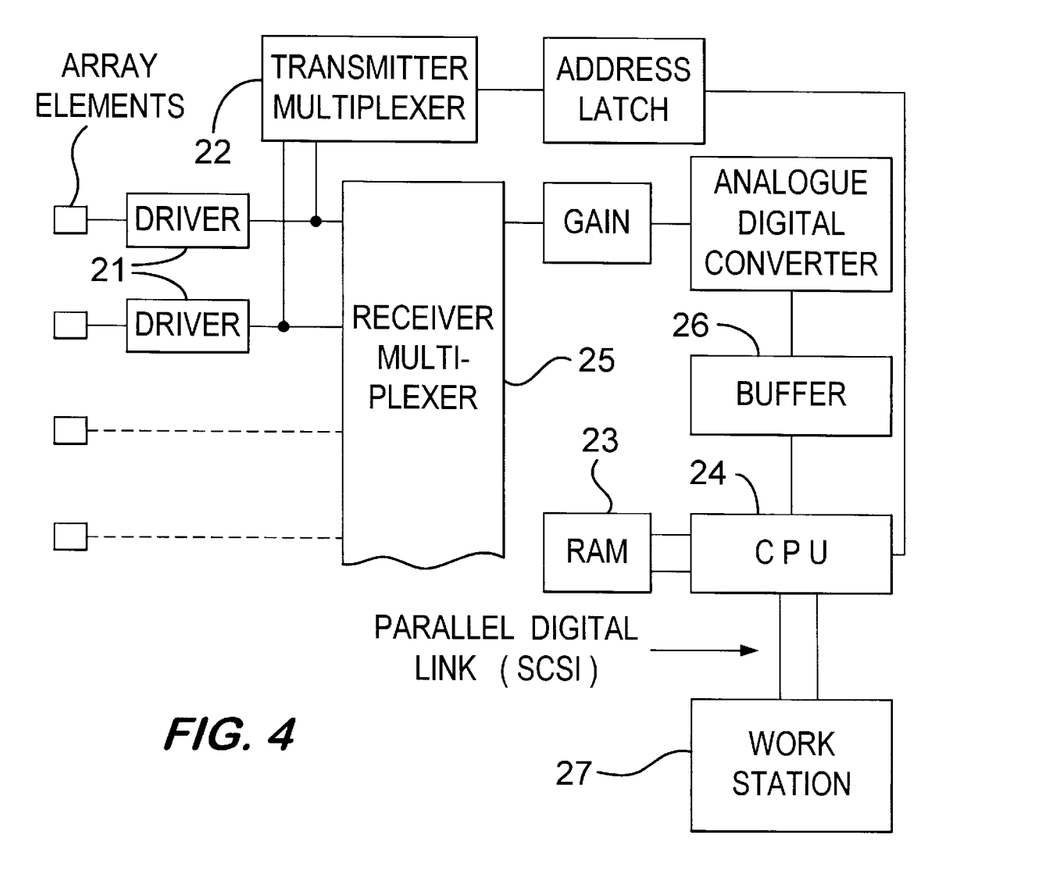
FIG. 4 shows in more detail the data processing at 11 in FIG. 2.

FIGS. 2–4

These figures illustrate in broad terms the various stages in the apparatus according to the present invention.

The first step is to capture the data representative of the internal human organ which it is intended to visualise. As described and shown in our earlier patent specifications an ultrasound array probe is connected physically to a transceiver. The transceiver excites the ultrasonic array by the multiplexing arrangement shown at 22 in FIG. 4 and samples return echoes received by the array by the multiplexing arrangement shown at 25 in FIG. 4. The excitation and sampling circuitry, in the present invention, are coherent thus providing a controlled phase delay between the start of excitation and the start of data sampling. In the normal mode of operating, each array element is excited separately using a circuit which is capable of controlling the amount of excitation (see drives 21 in FIG. 4), and the data is sampled from that element subsequently.

In another mode a particular array element may be excited and sampling performed on both it and its other group members sequentially in time but with so small a time increment that movement of external tissues (of the organ to be visualised) is negligible. The result of this group sampling is that data is gathered from an element and its neighbours such that the sample data of the neighbours contains information from the reflections of the excitation of the original element. Processing data from such a series of elements leads to a high definition visualisation of the human organ in question. The data capture step is indicated at 10 in FIG. 2. (shown in more detail in FIG. 4).

The next stage is indicated at 11 in FIG. 2 (shown in more detail in FIG. 4) and labelled "early data processing". The date transceiver referred to earlier contains special intelligence, in this embodiment, in the form of a 68010 16-bit microprocessor and computer memory (23 and 24 in FIG. 4). The microprocessor controls the sampling hardware circuitry to vary the excitation length and system gain. The sampling circuitry deposits a scan line data in relatively fast memory (26 in FIG. 4) from which the microprocessor (24 in FIG. 4) takes and copies data into a slower but larger data memory (23 in FIG. 4). This process is performed sequentially in time but with very short time increments, typically within 1 msec, thus substantially freezing external tissue motion. Data in the microprocessor memory can be manipulated by the microprocessor.

The "early data processing" arrangement 11 of FIG. 2 is shown in more detail in FIG. 4. The transceiver also allows the possibility of switching the transmit frequency, so A-scans at two or more frequencies can be obtained. There are two advantages to being able to acquire A-scans at different frequencies. First, many tissues have a characteristic frequency dependence of scattering or attenuation, which maybe used to discriminate tissue types. Second, if a transducer is driven at a frequency fd significantly different from one of its resonant mode frequency fo, the acoustic output and hence echoes, will consist of this forced drive at fd, followed by transducer ring-down components at the resonant frequency fo. Subsequent processing using standard filtering techniques can extract the component at fd, whilst removing the component at fo. Since the component at fo will also include the initial transducer ring-down, removing it will leave components with no ring-down, this simulating a very heavily damped transducer. Thus echoes off-resonance will be at a much lower amplitude and so will only be detectable for echoes close in to the transducer. Thus, a scheme of using two acquisitions for each A-scan can be implemented. The first acquisition will be off-resonance, and will detect echoes near in to the transducer, normally obscured by ring-down. The second acquisition will be at-resonance, and will be echoes further from the transducer, where ring-down is not a problem.

With this arrangement there is the facility for:

(a) coherent data averaging to improve the signal to noise ratio and reduce quantisation error noise through repetitive sampling of coherent signals, again with very small time increments;

(b) data conversion suitable for presentation to subsequent processing and display stages, e.g. between 16 bits integer and 32 bit floating point;

(c) resampling the data with a delay of half of the sample interval. If the time increments of the same A-scan is sufficiently short, the two scans can be combined to give one scan with an effective sample rate of double the sample rate of the original data;

(d) appropriate data reduction; many more points are sampled than displayed, and so a method is required to reduce the number of points by decimation (selection of points at equal intervals) or combination of points. Methods of data reduction are possible which minimise the amount of data lost;

(e) noise reducing using non-linear noise operators;

(f) other digital signalling processing operations;

(g) data transfer between the transceiver unit and the main computer.

Data is transferred to the main computer, which in this embodiment was a Hewlett-Packard 730 supercomputer work station, but can be any high performance work station, shown at 27 in FIG. 4. The next step is indicated at 12, and in this embodiment consists of the synthetic aperture focusing technique (S.A.F.T). With this technique, which is known in other fields, data previously collected from neighbouring groups of elements, where overlap exists between the spatial coverage of the group elements, is combined using an appropriate linear combination. The algorithm will incorporate the delays required to increase the resolution and focus the ultrasound data, the analog of the delay lines used in prior art methods. The algorithm used is the circular version of that proposed by, for example, Burkhardt, IEEE Transactions on Sonics and Ultrasonics, Vol SU-21, No 1, January 1974, or Flaherty et al (1967) in U.S. Pat. No. 3,548,642.

The coefficients can be extracted from two tables. A large table contains values for all data points with their associated SAFT group holding indices and coefficients so that SAFT calculations have ready pre-calculated parameters. A small table makes use of the symmetry of each group and contains indices and coefficients for a single group which may be applied to all groups using some extra computer operations from the main CPU in order to unwrap the group symmetry. This operation is performed on the H.P. 730 EX main CPU. The algorithm may also be implemented in the transceiver on the 68010 to achieve data reduction by data transfer.

The next stage is indicated at 13 in FIG. 2 and labelled "signal pre-processing and conditioning". In this embodiment the sample data can be processed in preparation for display by performing the following operations:

(a) Software Envelope Demodulation. The rf sample signal can be envelope detected in software by averaging to determine the signal offset, subtracting to remove this offset, taking the absolute value to perform full wave rectification and smoothing using standard digital filters.

(b) Transform Demodulation. Alternatively the rf data may be frequency demodulated in the frequency domain by using an FFT algorithm to transform the data, multiplicatively combining this with a low pass filter, removing the dc offset frequency and applying the inverse FFT; alternatively again a Hilbert transform may be applied to extract the signal envelope.

(c) Attenuation Correction or Time Gain Correction can be applied by multiplying the element data by the inverse of a curve representing the path attenuation. This attenuation curve can be generated by assuming fixed attenuation and may be supplied by an operator.

(d) Data Compression. The dynamic range of the sample data may be compressed by scaling the logarithm or square root of the original data.

The processing operations are performed on the main H.P. 730 CPU.

The next stage is indicated 14 and labelled "image construction". This process transforms the sample data train to the appropriate display geometry. For example, a cylindrical transducer array will require scan lines to be displayed as radial spokes. For each output pixel in that geometry the nearest sample points are determined and coefficients calculated so that combination of the sample points for the coefficients will deliver a value for the particular pixel. The coefficients may be selected such that linear interpolation is performed, or other functions. This algorithm may be combined with the linear combinations of the SAFT algorithm. Presently a system is used which renders an annular geometry with linear interpolation using, 1, 2 or 4 sample points.

The final step is indicated at 15 and labelled "image display".

The calculated groups of pixels, or pixmaps, are mapped using Gamma level and colour mapping tables and the resultant pixmap displayed on the screen of the Vistra 800EX workstation console.

The use of HP 730 and the combination of 68010 transceiver CPU, with the main CPU allows the update rate of the entire system to be high to provide flicker free display in real time. Particular use is made of X-window slide controls using a WIMP (Windows Icon Menu Pointer) user interface to control window levelling and field of view parameters.

Graphical overlays on the image allow the display of parameter values, scale information, and patient details. For the annular geometry, a circular graphics sprite in the centre of the B-mode image is used to denote the position and size of the ultrasound device. Measurement facilities allow the determination of linear, angular and area measurements.

As indicated earlier, the essential difference between the system of the present invention and the prior art is that the signal processing is carried out under stored program control (i.e by software). This means that as long as a signal is sampled adequately, in theory at least twice the maximum frequency and in practice four times the centre frequency, or 80 MHz in the present embodiment, infinitesimal delays can be produced by using simple mathematical algorithms relying on interpolation. With this approach, the present invention provides the advantage that only modest (i.e relatively low) sampling rates are required. This has the practical advantage that the speed and cost of ADC and 'fast' memory is lower than using very high sampling rates. It does, however, result in a system which requires relatively high computing power but this is not felt to be a disadvantage because in recent years computing power has been increasingly available at decreasing costs. The software nature of this embodiment of the invention of the B-mode system gives great advantages over fixed hardware analog or digital systems. Real-time SAFT and other algorithms to improve image quality can be used through the use of high-speed processing chips such as the i860 where fixed hardware implementations would be difficult or impossible to develop. The pre-calculated SAFT table allows a large reduction in calculational effort and allows variable focus SAFT to be used in which each sample point from an array element may remain in focus.

The software system allows other algorithms such as tissue characterisation to be incorporated with ease. The controllable sampling circuitry and distributed processing pipeline give greater flexibility allowing multiple mode of operation with optimised sampling schemes as necessary.

As indicated earlier it is known from the prior art to have so-called B-mode systems for many ultrasonic products including other intravascular ultrasound products. However, these prior art systems use analog signal processing or hardware digital signal processing, often with later digitisation of the analog image signal to provide digital images. The present invention differs essentially from these prior art arrangements in that the processing is carried out under stored program control i.e by software instead of by hardware.

Although the present invention has particular application in intrusive ultrasound systems for medical use, the present invention could be applied to external medical ultrasound systems.

The present embodiment involves a data acquisition system which generates a constant size data block irrespective of the field of view.

Generally, in a digital ultrasound system the display resolution is principally determined by three key parameters, namely:

1. the excitation frequency;
2. the number of excitation pulses;
3. the number of display pixels that each A-scan line is mapped to.

If the crystal is excited by a single pulse at a frequency F then interfaces which are separated by less than one wavelength (where the wavelength is equal to the velocity V of ultrasound divided by the frequency F) cannot be resolved.

If a burst of more than one cycle is used to excite the crystal then the resolution is equal to the wavelength multiplied by the number of pulses.

In the display, resolution is limited by the number of pixels in each line of the displayed image. If each A-scan line is mapped to N pixels and the scan line represents D meters of tissue, then the display resolution is D divided by N.

It therefore follows that the information content of the display is constant since the number of pixels is fixed regardless of the size of the field of view. However, the quantity of raw data generated at the front end of the system by the digital to analog converter is directly proportional to the field of view. The processing of this excess data can degrade the performance, in particular speed, of the system while not enhancing the quality of the displayed image. The basic point is that the number of samples per transducer element is many more than will be displayed. Typically 1000 points is reduced to 128 or 256 points. The data reduction is a demodulation process akin to amplitude modulation detection in a radio receiver.

The present invention therefore involves data reduction and this results in a fixed quantity of data regardless of the field of view. This is achieved by controlling the number of excitation pulses in relation to the field of view of the displayed image and then decimating the sample data set to a constant size.

If the field of view is large then each displayed cell in the final image will correspond to a larger segment of that raw data and hence more cycles of the raw data than if the field of view is small.

It is therefore appropriate to transmit a tone burst of that number of cycles. If a shorter tone burst is transmitted it will not be possible to display adequately the finer resolution that this gives. However, if a long tone burst is transmitted then additional cycles will contain no new information and therefore need not be sampled. So therefore by sampling for example, alternate cycles, the amount of data can be reduced whilst retaining the phase and amplitude information.

The number of cycles that can be omitted will depend on the number of cycles equivalent to the displayed resolution cell (pixel) which in turn will depend on the field of view.

In order to achieve this state of reduction, it is necessary to tailor the number of cycles in the transmit pulse to the field of view which is why it is in practice advantageous to use an "intelligent" transceiver system in which the number of cycles in the excitation pulse is under software control.

In the embodiment described the samples are taken at a constant rate and then redundant samples discarded prior to transmission to the host computer. The following is an example in order to illustrate what has just been described.

EXAMPLE

If the ultrasound frequency is 20 MHz, the sampling frequency 80 MHz, and the field of view 9.6 mm, then 9.6 mm worth of scan will take 12.8 $\mu$sec at 80 MHz and this will correspond to 1024 points.

If this is displayed on a radius of 128 points each point will correspond to:

0.1 $\mu$sec
2 cycles
8 points

It is probably wise not to data reduce further so 1024 points are required per scan. However, if the field of view doubles to 19.2 mm, this will take 25.6 $\mu$sec corresponding to 2048 points.

If still displayed on 128 points each point will correspond to:

0.2 $\mu$sec
4 cycles
16 points

If the tone-burst is 4 cycles, it would be permissible to sample two cycles, and skip two without losing information. Therefore, the amount of data is 2048/2=1024, and by increasing the tone burst, to match the resolution, the data can be kept at 1024 even for a higher field of view.

We claim:

1. Ultrasonic apparatus for visualizing internal organs of a human body, comprising:

means for energizing elements of an ultrasonic transducer array to transmit ultrasonic vibrations from the elements;

means for acquiring echo signals in response to said energization;

means for sampling the echo signals at sample intervals so as to digitize said echo signals;

means for applying a delay to each echo signal;

means for storing a program;

means for controlling said means for applying a delay in accordance with said stored program so as to enable the delays to be produced by interpolation so they can take any value within a sample interval and to be less than the sample intervals; and said means for applying a delay operates independently of the means for sampling.

2. Apparatus as claimed in claim 1 in which a sampling frequency of the means for sampling is in the range of twice to four times the signal frequency.

3. Ultrasonic apparatus for visualizing internal organs of a human body, comprising:

means for energizing elements of an ultrasonic transducer array to transmit ultrasonic vibrations from the elements;

means for acquiring echo signals in response to said energization;

means for sampling the echo signals at a sampling rate so as to digitize said echo signals;

means for applying a delay to each sampled echo signal; and means for generating a data block in response to the sampled and delayed echo signals, in which the data block is always of a preset size irrespective of a field of view of the transducer array, said means for generating a data block being adapted to use the sampling rate according to the field of view in order to keep the amount of data to be processed constant and being adapted to increase the number of excitation cycles as the field of view increases, so that ultrasound resolution relates to displayed resolution.

4. Ultrasonic apparatus for visualizing internal organs of a human body, comprising:

means for energizing elements of an ultrasonic transducer array to transmit ultrasonic vibrations from the elements;

means for acquiring echo signals in response to said energization;

means for sampling the echo signals so as to digitize said echo signals;

means for applying a delay to each echo signal; and means for generating a data block in response to the sampled and delayed echo signals, in which the data block is always of a preset size irrespective of a field of view of the transducer array, said means for generating a data block being adapted to increase the number of excitation cycles as the field of view increases, so that ultrasound resolution relates to displayed resolution.

5. Ultrasonic apparatus for visualizing internal organs of a human body, comprising:

means for energizing elements of an ultrasonic transducer array to transmit ultrasonic vibrations from the elements;

means for acquiring echo signals in response to said energization;

means for sampling the echo signals so as to digitize said echo signals;

means for applying a delay to each echo signal;

means for generating a data block in response to the sampled and delayed echo signals, in which the data block is always of a preset size irrespective of a field of view of the transducer array, said means for generating a data block being adapted to increase the number of excitation cycles as the field of view increases, so that ultrasound resolution relates to displayed resolution; and means for tailoring the number of cycles in a transmit pulse to the field of view.

6. Ultrasonic apparatus for visualizing internal organs of a human body, comprising:

means for energizing elements of an ultrasonic transducer array to transmit ultrasonic vibrations from the elements;

means for acquiring echo signals in response to said energization;

means for sampling the echo signals so as to digitize said echo signals;

means for applying a delay to each echo signal;

means for exciting transducers of said transducer array at two frequencies, one frequency being a non-resonant frequency in order to reduce ring-down; and means for combining echo signals acquired at the two frequencies to allow display of echoes normally in a ringdown region of the transducer.

7. Ultrasonic apparatus for visualizing internal organs of a human body, comprising:

means for exciting a sub-group of at least one transducer element of an ultrasonic transducer array to transmit ultrasonic vibrations from the at least one element;

means for acquiring echo signals by said at least one transducer element in response to said excitation;

means for employing a synthetic aperture focusing with respect to said echo signals; and means for sampling the echo signals received by both a given transducer element of said sub-group and at least one other transducer element of a sub-group which is different from the excited sub-group, both of which echo signals were acquired in response to the excitation of said at least one transducer element of said sub-group, so as to digitize said echo signals.

8. Ultrasonic apparatus for visualizing internal organs of a human body, comprising:

means for exciting a sub-group of at least one transducer element of an ultrasonic transducer array to transmit ultrasonic vibrations from the at least one element, wherein said means for exciting excites a single transducer element of a sub-group at a time, means for acquiring echo signals by said at least one transducer element in response to said excitation; wherein said means for acquiring acquires said echo signals from said single transducer element, and means for sampling the echo signals received by both a given transducer element of said sub-group and at least one other transducer element of a sub-group which is different from the excited sub-group, both of which echo signals were acquired in response to the excitation of said at least one transducer element of said sub-group, so as to digitize said echo signals, wherein said means for sampling samples the echo signals received by only said single transducer element and thereafter only on another transducer element of a sub-group which is different from the single transducer element of the excited sub-group.

9. Apparatus as claimed in claim 8 wherein said means for exciting transmits on said single transducer element and said means for acquiring thereafter acquires echo signals from only said single transducer element during a first acquisition step, and then in a second sequential acquisition step, said means for exciting for acquiring thereafter acquires echo signal from only said another transducer element of the different sub-group.

10. Ultrasonic apparatus for visualizing internal organs of a human body, comprising:

means for exciting a sub-group of at least one transducer element of an ultrasonic transducer array to transmit ultrasonic vibrations from at least one element;

means for acquiring echo signals by at least one transducer element in response to said excitations;

means for sampling the echo signals received by both a given transducer element of said sub-group and at least one other transducer element of a sub-group which is different from the excited sub-group, both of which echo signals were acquired in response to the excitation of said at least one transducer element of said sub-group, so as to digitize said echo signals;

means for applying a delay to each echo signal;

means for storing a program;

means for controlling said means for applying a delay in accordance with said stored program so as to enable the delays to be produced by interpolation and to be less than the sample intervals; and said means for applying a delay operates independently of the means for sampling.

11. Ultrasonic apparatus for visualizing internal organs of a human body, comprising the steps of:

exciting a sub-group of at least one transducer element of an ultrasonic transducer array to transmit ultrasonic vibrations from at least one element;

acquiring echo signals by at least one transducer element in response to said excitations;

sampling the echo signals received by both a given transducer element of said sub-group and at least one other transducer element of a sub-group which is different from the excited sub-group, both of which echo signals were acquired in response to the excitation of said at least one transducer element of said sub-group, so as to digitize said echo signals;

applying a delay to each echo signal, independently of the sampling;

storing a program;

controlling said delay in accordance with said stored program so as to enable the delays to be produced by interpolation and to be less than the sample intervals.

12. Ultrasonic apparatus for visualizing internal organs of a human body, comprising:

a catheter for insertion within a blood vessel of a person;

an ultrasonic transducer array formed at an end of the catheter and including at least one transducer element;

means for exciting a sub-group of at least one transducer element of an ultrasonic transducer array to transmit ultrasonic vibrations from the at least one element;

means for acquiring echo signals by said at least one transducer element in response to said excitation; and means for sampling the echo signals received by both a given transducer element of said sub-group and at least one other transducer element of a sub-group which is different from the excited sub-group, both of which echo signals were acquired in response to the excitation of said at least one transducer element of said sub-group, so as to digitize said echo signals, and a sampling frequency of the means for sampling is in the range of twice to four times the signal frequency.

13. Ultrasonic apparatus for visualizing internal organs of a human body, comprising:

a catheter for insertion within a blood vessel of a person;

an ultrasonic transducer array formed at an end of the catheter and including at least one transducer element;

means for energizing elements of the ultrasonic transducer array to transmit ultrasonic vibrations from the elements;

means for acquiring echo signals in response to said energization;

means for sampling the echo signals at a sampling rate so as to digitize said echo signals;

means for applying a delay to each sampled echo signal; and means for generating a data block in response to the sampled and delayed echo signals, in which the data block is always of a preset size irrespective of a field of view of the transducer array, said means for generating a data block being adapted to use the sampling rate according to the field of view in order to keep the amount of data to be processed constant and being adapted to increase the number of excitation cycles as the field of view increases, so that ultrasound resolution relates to displayed resolution.

14. Ultrasonic apparatus for visualizing internal organs of a human body, comprising:

a catheter for insertion within a blood vessel of a person;

an ultrasonic transducer array formed at an end of the catheter and including at least one transducer element;

means for energizing elements of the ultrasonic transducer array to transmit ultrasonic vibrations from the elements;

means for acquiring echo signals in response to said energization;

means for sampling the echo signals so as to digitize said echo signals;

means for applying a delay to each sampled echo signal; and means for generating a data block in response to the sampled and delayed echo signals, in which the data block is always of a preset size irrespective of a field of view of the transducer array, said means for generating a data block being adapted to increase the number of excitation cycles as the field of view increases, so that ultrasound resolution relates to displayed resolution.

15. Ultrasonic apparatus for visualizing internal organs of a human body, comprising:

a catheter for insertion within a blood vessel of a person;

an ultrasonic transducer array formed at an end of the catheter and including at least one transducer element;

means for energizing elements of the ultrasonic transducer array to transmit ultrasonic vibrations from the elements;

means for acquiring echo signals in response to said energization;

means for sampling the echo signals so as to digitize said echo signals;

means for applying a delay to each sampled echo signal;

means for generating a data block in response to the sampled and delayed echo signals, in which the data block is always of a preset size irrespective of a field of view of the transducer array, said means for generating a data block being adapted to increase the number of excitation cycles as the field of view increases, so that ultrasound resolution relates to displayed resolution; and means for tailoring the number of cycles in a transmit pulse to the field of view.

16. Ultrasonic apparatus for visualizing internal organs of a human body, comprising:

a catheter for insertion within a blood vessel of a person;

an ultrasonic transducer array formed at an end of the catheter and including at least one transducer element;

means for energizing elements of the ultrasonic transducer array to transmit ultrasonic vibrations from the elements;

means for acquiring echo signals in response to said energization;

means for sampling the echo signals so as to digitize said echo signals;

means for applying a delay to each sampled echo signal;

means for exciting transducers of said transducer array at two frequencies, one frequency being a non-resonant frequency in order to reduce ring-down; and means for combining echo signals acquired at the two frequencies to allow display of echoes normally in a ringdown region of the transducer.

17. Ultrasonic apparatus for visualizing internal organs of a human body, comprising:

a catheter for insertion within a blood vessel of a person;

an ultrasonic transducer array formed at an end of the catheter and including at least one transducer element;

means for exciting a sub-group of at least one transducer element of the ultrasonic transducer array to transmit ultrasonic vibrations from the at least one element;

means for acquiring echo signals by said at least one transducer element in response to said excitation;

means for employing a synthetic aperture focusing with respect to said echo signals; and means for sampling the echo signals received by both a given transducer element and at least one other transducer element of a sub-group which is different from the excited sub-group, so as to digitize said echo signals.

18. Apparatus as claimed in claim 17 wherein:

said means for exciting excites a single transducer element of a sub-group at a time, said means for acquiring acquires said echo signals from said single transducer element, and said means for sampling samples the echo signals received by only said single transducer element and thereafter only on another transducer element of a sub-group which is different from the single transducer element of the excited sub-group.

19. Ultrasonic apparatus for visualizing internal organs of a human body, comprising:

a catheter for insertion within a blood vessel of a person;

an ultrasonic transducer array formed at an end of the catheter and including at least one transducer element;

means for exciting a sub-group of at least one transducer element of an ultrasonic transducer array to transmit ultrasonic vibrations from the at least one element, wherein said means for exciting excites a single transducer element of a sub-group at a time;

means for acquiring echo signals by said at least one transducer element in response to said excitation, wherein said means for acquiring acquires said echo signals from said single transducer element; and means for sampling the echo signals received by both a given transducer element and at least one other transducer element of a sub-group which is different from the excited sub-group, so as to digitize said echo signals, wherein said means for sampling samples the echo signals received by only said single transducer element and thereafter only on another transducer element of a sub-group which is different from the single transducer element of the excited sub-group; and wherein said means for exciting transmits on said single transducer element and said means for acquiring thereafter acquires echo signals from only said single transducer element during a first acquisition step, and then in a second sequential acquisition step, said means for exciting transmits on said single transducer element, and said means for acquiring thereafter acquires echo signal from only said another transducer element of the different sub-group.

20. Ultrasonic apparatus for visualizing internal organs of a human body, comprising:

a catheter for insertion within a blood vessel of a person;

an ultrasonic transducer array formed at an end of the catheter and including at least one transducer element;

means for exciting a sub-group of at least one transducer element of the ultrasonic transducer array to transmit ultrasonic vibrations from at least one element;

means for acquiring echo signals by at least one transducer element in response to said excitations;

means for sampling the echo signals received by both a given transducer element of said sub-group and at least one other transducer element of a sub-group which is different from the excited sub-group, both of which echo signals were acquired in response to the excitation of said at least one transducer element of said sub-group, so as to digitize said echo signals;

means for applying a delay to each echo signal;

means for storing a program;

means for controlling said means for applying a delay in accordance with said stored program so as to enable the delays to be produced by interpolation and to be less than the sample intervals; and said means for applying a delay operates independently of the means for sampling.

21. Ultrasonic method for visualizing internal organs of a human body, comprising the steps of:

a catheter for insertion within a blood vessel of a person;

an ultrasonic transducer array formed at an end of the catheter and including at least one transducer element;

exciting a sub-group of at least one transducer element of the ultrasonic transducer array to transmit ultrasonic vibrations from at least one element;

acquiring echo signals by at least one transducer element in response to said excitations;

sampling the echo signals received by both a given transducer element of said sub-group and at least one other transducer element of a sub-group which is different from the excited sub-group, both of which echo signals were acquired in response to the excitation of said at least one transducer element of said sub-group, so as to digitize said echo signals;

applying a delay to each echo signal, independently of the sampling;

storing a program;

controlling said delay in accordance with said stored program so as to enable the delays to be produced by interpolation and to be less than the sample intervals.

* * * * *